United States Patent Office 3,339,135
Patented Aug. 29, 1967

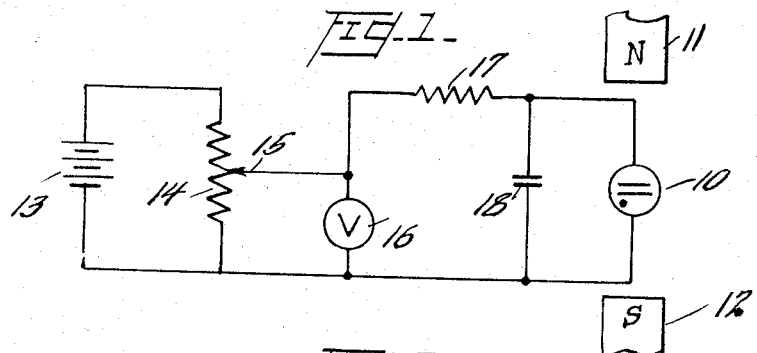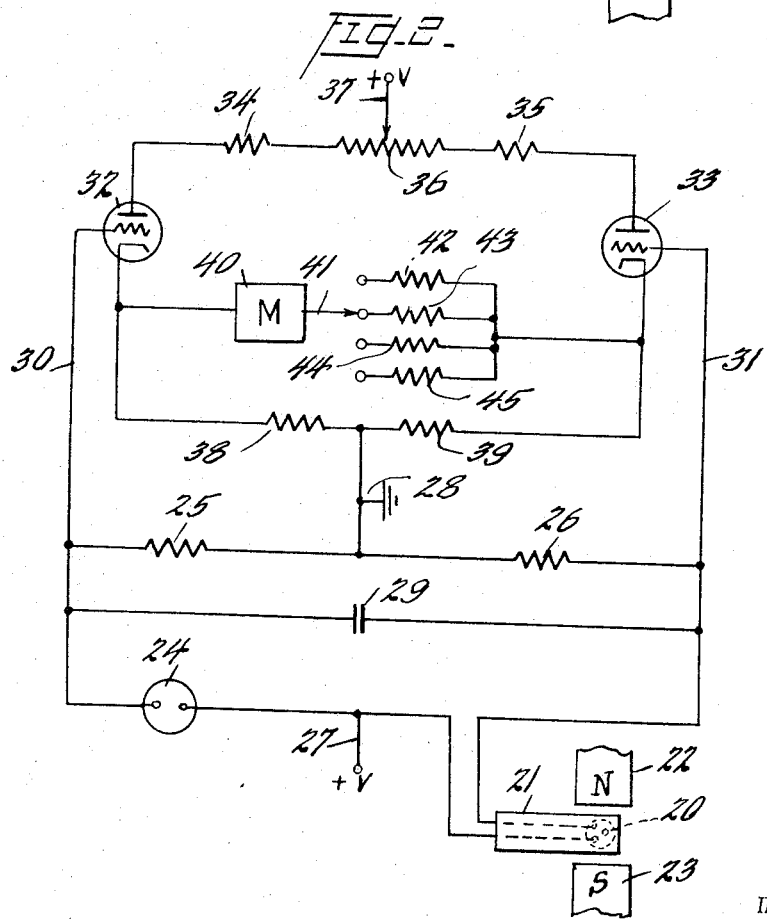

3,339,135
METHOD FOR MEASURING THE INTENSITY OF A MAGNETIC FIELD UTILIZING A GAS DISCHARGE DEVICE
Harold C. Anderson, Silver Spring, Md., assignor to Litton Systems, Inc., College Park, Md.
Original application Mar. 12, 1962, Ser. No. 178,867, now Patent No. 3,265,965. Divided and this application Jan. 17, 1966, Ser. No. 539,597
1 Claim. (Cl. 324—43)

This is a division of application Ser. No. 178,867, filed Mar. 12, 1962, now Patent No. 3,265,965.

This invention generally relates to improvements in magnetometers and is particularly concerned with an improved magnetometer device that is small, lightweight, portable and inexpensive.

Very generally according to the invention there is provided a magnetic field strength measuring device that employs a gaseous discharge device whose degree of ionization or electrical conductivity is a function of the strength of the magnetic field to which the gas is subjected. According to one preferred embodiment of the invention the gaseous discharge device is subjected to the magnetic field to be measured and the degree of ionization thereof is determined by a novel circuit for obtaining the critical voltage at which the gas device will enter into the glow discharge region. According to another embodiment of the invention, the degree of ionization of the gas is determined by employing a novel amplifying bridge circuit wherein the conductivity or degree of ionization of the device is compared with that of a second discharge device disposed outside of the magnetic field.

It is accordingly a principal object of the invention to provide a small, lightweight, portable, and inexpensive magnetometer.

A further object of the invention is to provide such a magnetometer that is comprised of standard and available electrical components.

Another object is to provide such a magnetometer employing a miniature probe of miniature energizing circuits that may be battery powered.

A still further object of the invention is to provide such a magnetometer capable of measuring magnetic field strength over a wide range of variation.

Other objects and additional features of the invention will be more readily comprehended by those skilled in the art after a detailed consideration of the following specification taken with the accompanying drawing wherein:

FIG. 1 is an electrical schematic representation of one embodiment of the invention, and FIG. 2 is an electrical schematic drawing of another embodiment of the invention.

Referring now to the drawings, there is shown in FIG. 1 a magnetometer circuit comprising a gas discharge device 10 adapted to be inserted in the magnetic field to be measured, such as between a pair of magnet poles 11 and 12, as illustrated. The gas discharge device 10 may be a miniature gas discharge tube filled with neon gas or other suitable ionizable gas such as argon, helium or the like, and incorporating a pair of energizable electrodes therein for creating an electric field in the gas. The tube 10 is preferably incorporated within a miniature probe, such as 21 in FIG. 2, for enabling the magnetometer to detect the magnetic fields existing in either confined spaces or over an extended region.

As is known to those skilled in the art, the degree of ionization of the gas within tube 10, or the conductivity thereof, is a direct function of the strength of the electric field and accordingly a function of the electrical potential across the electrodes. Conversely, the conductivity of the gas is an inverse function of the strength of the external magnetic field.

To detect the conductivity of the gas as a function of the external magnetic field, to be measured, the circuit of FIG. 1 provides a means for controllably varying the strength of the applied electric field to balance out the effect of the unknown magnetic field whereby the conductivity of the gas tube 10 is maintained at a constant level. The necessary increase or decrease in the electric field to maintain this balance can then be easily measured by the voltage across the gas tube 10 whereby this voltage output reading may be calibrated to provide a direct measure of the strength of the magnetic field.

For producing a controllably varying voltage across gas tube 10, there is provided a direct current battery 13 energizing a potentiometer 14 having a movable tap 15 for selecting any portion or all of the battery potential. The controllable voltage at tap 15 is measured by a voltmeter, which is suitably calibrated to directly indicate magnetic field strength rather than volts. This variable direct current voltage is directed through a series connected resistor 17 to gradually charge a capacitor 18, connected in parallel to the gas tube.

In operation, this circuit generally functions in the manner of a relaxation oscillator with the potential across capacitor 18 progressively increasing during charging thereof until it reaches the discharge potential of gas tube 10, whereupon the capacitor 18 discharges through the tube 10 to produce a glow discharge therein, and the cycle then begins anew. For calibrating the voltmeter 16 under ambient conditions, the voltage at 16 is initially adjusted to a critical value immediately below the glow discharge potential of tube 10, whereupon the circuit does not oscillate. This establishes a fixed critical level of conduction or ionization within tube 10 immediately below the glow discharge region.

The probe supporting gas tube 10 is then inserted into the magnetic field to be determined and the slider or tap 15 on the potentiometer 14 is varied to change the voltage across tube 10 to a different value necessary to compensate for the different magnetic field. In this operation the slider 15 is again adjusted to a critical position immediately below that needed for glow discharge of the tube 10. This may be easily performed by initially adjusting the slider 15 until the circuit commences to operate as an oscillator and gradually backing away from this position until a critical position is reached wherein oscillation stops. At this latter voltage value, the tube 10 is at the same degree of ionization or conduction as initially and therefore the change in the reading of voltmeter 16 from its initial value is that needed to compensate or balance the effect of the magnetic field and therefore is a measure of the magnetic field strength.

According to another embodiment of the invention shown in FIG. 2, the magnetic field is also determined or measured by the change in conductivity or degree of ionization of a gaseous discharge tube, such as 20, which is incorporated within a miniature probe 21. In this embodiment, a second substantially identical gaseous discharge tube 24 is employed as a reference or standard, and the difference between the conductivities of the two tubes 20 and 24 is employed as a measure of the strength of the field.

As shown, the probe gas tube 20, is inserted in the lower right hand arm of a Wheatstone type bridge and the second or standard tube 24 is inserted in the lower left hand arm. The opposite two arms of the bridge are occupied by equal valued resistors 25 and 26, which may be made variable, or supplied with vernier resistors (not shown) to balance out any minor difference in normal conductivity between the two gas discharge tubes 24 and 25. One diagonal of the bridge is energized by a direct current battery 27 and the other terminal to ground 28 whereas the other diagonal of the bridge provides a differential output error signal across lines 30 and 31. In this embodiment, the insertion of probe 21 into the magnetic field to be determined varies the conductivity or degree of ionization of gas tube 20 over that of gas tube 24 and consequently unbalances the bridge to produce a differential error signal across lines 30 and 31. This error signal is proportional to the strength of the magnetic field being measured.

For amplifying and reading out this error signal, lines 30 and 31 are directed to the control grids of vacuum tubes 32 and 33, which are also connected in a bridge or differential type circuit. The potential on line 30 controls the current flow through tube 32 and hence determines the voltage drop across cathode resistor 38. Similarly the signal on line 31 controls the impedance or current flow through tube 33 and hence determines the voltage drop across resistor 39. The difference between these two voltage drops is produced across the cathodes of the two tubes 32 and 33 and is measured by a meter 40 connected in series selectively with one of resistors 42 and 45, respectively. The resistors 42 and 45 are of progressively increasing resistance value to enable different ranges of magnetic field measurement to be made, as is believed apparent to those skilled in the art.

As in the first embodiment discussed above, the meter 40 may be calibrated directly in terms of the magnetic field whereby its reading provides a direct indication of the strength of the field.

For initially balancing the electron tube bridge to provide equal current flow through the tubes 32 and 33, a potentiometer 36 is provided in the plate circuits of the tubes and having its movable slider or tap 37 energized by the battery source. Adjustment of the slider 37 differentially varies the energization of the tubes permitting the tube bridge to be initially balanced prior to insertion of the probe 21 into the magnetic field to be detected.

Although but two preferred embodiments of the invention have been illustrated and described many changes may be made without departing from the spirit and scope of the invention. Accordingly this invention is to be considered as limited only according to the following claim.

What is claimed is:

A process for measuring the intensity of a magnetic field comprising the steps of: subjecting a gas discharge tube to a time variable increasing electrical field with the maximum value of said field being just insufficient to create a discharge in said tube when said tube is positioned outside of a magnetic field to be measured, placing said discharge tube in a magnetic field to be measured and adjusting the intensity of said time variable electrical field to a different range with the maximum value of said different range being again just insufficient to create a discharge in said tube, and determining the difference in said maximum values of said field as a function of the strength of the magnetic field; the steps of subjecting the tube to the time variable increasing electrical fields being performed by adjusting the maximum values of the electrical fields to a level sufficient to create a discharge in said tube and reducing the maximum values of said fields until they are just insufficient to create a discharge in said tube.

References Cited

UNITED STATES PATENTS

| | | | |
|---|---|---|---|
| 2,175,702 | 10/1939 | Rose | 324—44 |
| 2,509,394 | 5/1950 | Kinslow | 324—44 |
| 2,571,156 | 10/1951 | Nelson | 324—43 |
| 2,639,409 | 5/1953 | Cobine | 331—129 |

FOREIGN PATENTS

| | | |
|---|---|---|
| 472,168 | 9/1937 | Great Britain. |
| 735,221 | 11/1932 | France. |

OTHER REFERENCES

Gottlieb, I.: The RF "Sniffer," The Radio Amateur's Journal; vol. 7, March 1951, page 33.

RUDOLPH V. ROLINEC, *Primary Examiner.*

WALTER L. CARLSON, *Examiner.*

R. J. CORCORAN, *Assistant Examiner.*